2,371,872

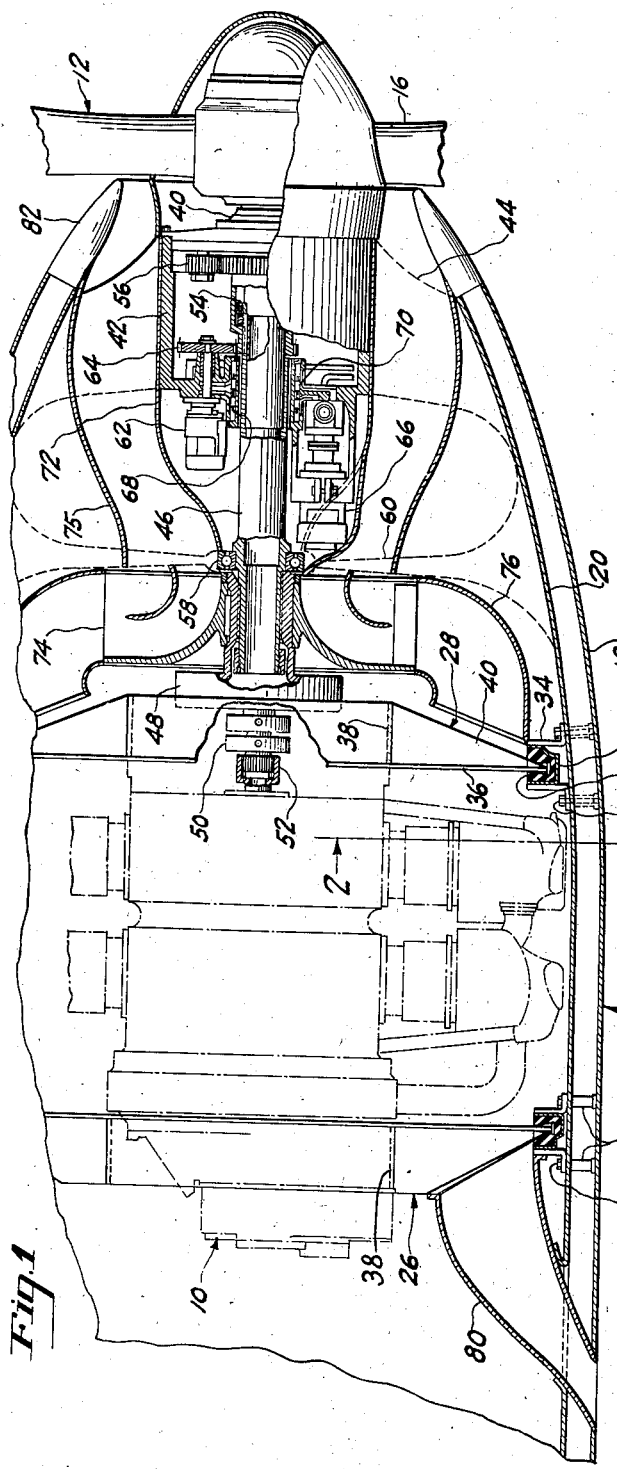
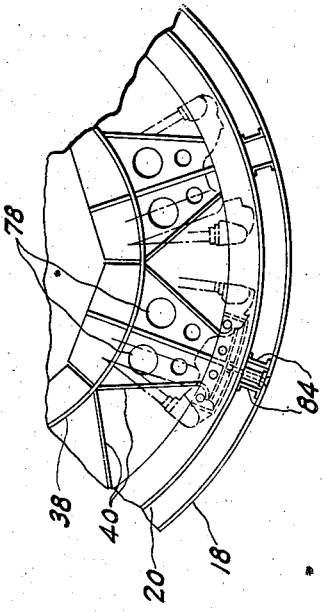
INVENTORS
Frank W. Caldwell
Erle Martin
BY Harris G. Luther
ATTORNEY Patented Mar. 20, 1945

UNITED STATES PATENT OFFICE 2,371,872

AIRCRAFT POWER PLANT

Frank W. Caldwell and Erle Martin, West Hartford, Conn., assignors to United Aircraft Corporation, East Hartford, Conn., a corporation of Delaware Application August 19, 1939, Serial No. 291,067

1 Claim. (Cl. 170—135.6)

This invention relates to improvements in aircraft power plants and has particular reference to an improved mounting for an aircraft engine-propeller combination.

An object of the invention resides in the provision of an improved aircraft power plant mounting in which the aircraft propeller and the propeller driving engine are independently supported by a streamlined enclosing structure.

A further object resides in the provision of an improved aircraft power plant mounting of the character indicated in which the engine and the propeller are independently supported by resilient mountings and a flexible drive is provided between the engine and the propeller.

A still further object resides in the provision of an improved aircraft power plant and mounting therefor in which the control devices and the pitch changing fluid for a controllable-pitch propeller are disposed in a unit with the propeller and are entirely independent of the engine.

Other objects and advantages will be more particularly pointed out hereinafter or will become apparent as the description proceeds.

In the accompanying drawing, in which like reference numerals are used to designate similar parts throughout, there is illustrated a suitable mechanical embodiment for the purpose of disclosing the invention. The drawing, however, is for the purpose of illustration only and is not to be taken as limiting the invention since it will be apparent to those skilled in the art that various changes in the illustrated embodiment may be resorted to without in any way exceeding the scope of the invention.

In the drawing,

Fig. 1 is a central longitudinal sectional view through an aircraft power plant of the character indicated, the engine being diagrammatically illustrated only, and Fig. 2 is a transverse sectional view of a fragmentary portion of the power plant taken on the line 2—2 of Fig. 1 looking in the direction of the arrows.

Referring to the drawing in detail, the numeral 10 indicates an engine such as an air cooled radial internal combustion engine conventionally employed for the propulsion of aircraft and the numeral 12 generally indicates a controllable-pitch aeronautical propeller driven by the engine 10. The engine is surrounded and supported by a streamlined enclosure, generally indicated at 14, of circular or rounded cross section which extends forwardly of the engine to a location adjacent to the propeller blades 16, the forward portion of the enclosure being tapered inwardly to provide a low air resistant streamlined form. The enclosure or nacelle has an outer wall 18 and an inner wall 20 substantially concentric with the outer wall and held in spaced relation with respect thereto by the spacers 22 and through bolts 24. At its rearward end the nacelle 14 is secured to an airplane wing or fuselage, not illustrated, in a manner sufficiently strong to support the weight of the overhanging engine and propeller.

The engine is carried by end supports 26 and 28 in the form of annular reinforced members mounted at their periphery in resilient cushion elements 30 set in metal containers 32 carried by brackets 34 supported by the through bolts 24 to provide resilient connections between the end supports and the nacelle or enclosure 14, the end supports being rigidly secured to the engine near their centers. Each of the end supports, 26 and 28, may conveniently comprise a substantially circular aperture disc 36, and annular member 38 secured to the disc surrounding the aperture and located substantially concentric of the disc, and a plurality of triangular braces 40 extending from the annular member 38 to the periphery of the disc 36. Both end supports are substantially similar in construction except for certain necessary openings provided for engine accessories and the flow of cylinder cooling air, and are so disposed that the disc portions face each other. The reduced end portions of the engine project through the end supports and are secured to the annular members 38.

The propeller 12 is rotatably supported in a bearing 40 secured in an annular housing 42 supported in the forward portion of the enclosure 14 by suitable means such as the radial brackets 44. The propeller is driven by means of an extension shaft 46 operatively connected at one end to the engine through the vibration suppressing torque drive 48 and universal joint 50 and spline drive 52 and at the other end to the propeller through the connecting shaft 54 and reduction gear 56. The shaft 46 may be intermediately supported by an anti-friction bearing 58 supported by the enclosure 14 by the radial bracket 60. The housing 42 may conveniently support the propeller governor 62 driven from the shaft 46 through the gear drive 64 and a motor driven hydraulic pump 66 for supplying hydraulic fluid under pressure to change the pitch of the propeller 12 under the control of the governor 62. This pump may also furnish hydraulic fluid under high pressure to feather and unfeather the propeller. The governor control may be through a hydraulic valve somewhat schematically illustrated at 68, and the feathering and unfeathering of the propeller may be controlled by a valve, as illustrated at 70. The housing 42 may constitute a reservoir for the hydraulic fluid used to change the pitch of the propeller and this housing together with projecting parts of the governor 62 and motor 66 may be enclosed in a suitable sheet metal casing 72.

Certain features of the governor, its support and control mechanism shown but not claimed in this application are claimed in co-pending U. S. application Serial No. 333,981.

A fan or blower 74 may be mounted on the portion of the extension shaft 46 between the torque drive 48 and the intermediate bearing 68 to supply cooling air to the engine. The air may be directed through a suitable fixed annular duct 76, which may, if desired, be provided with suitable partitions for directing the air against the engine cylinders, and the supporting disc 36 may be provided with apertures, as indicated at 78 in Fig. 2, to permit the passage of air through the end support 28 to the engine cylinders. The rear end support 26 is also provided with air passages, not illustrated, which lead to the portion of the enclosure to the rear of the engine where suitable apertures may be provided in the enclosure to vent the cooling air from the enclosure. If desired, the cooling air may be led from the support through a suitable annular duct, as indicated at 80.

As is particularly illustrated at 82 the forward portion of the enclosure 14 is drawn in closely to the propeller hub to provide an efficient streamlined shape for the enclosure, the cooling air being drawn at high velocity through the relatively narrow space between the end of the enclosure and propeller hub by the action of the blower 74. If desired, the end portion 82 may be provided with adjustable means for controlling the area of the air entrance space to thereby control the operating temperature of the engine.

As stated above the double wall enclosure 14 is rigidly secured at its rearward end to the airplane and constitutes the sole support for the airplane engine and propeller. If found necessary or desirable the enclosure may be reinforced by the provision of spaced longitudinal ribs or web members, as indicated at 84 in Fig. 2, disposed between the inner and outer walls of the closure and rigidly secured at their edges to both walls. However, various constructional forms may be used for the enclosure without in any way exceeding the scope of the invention, the only qualification being that the enclosure or nacelle shall have sufficient structural strength to support the engine and the propeller.

With this arrangement the engine, the propeller and the enclosure may be formed as a unit and the enclosure may, if desired, be detachably secured to the airplane so that one unit may be readily substituted for another without any extensive delay in airplane operation. For example, supposing the airplane of a transport company to be equipped with power units of the type hereinabove described, by providing a few additional power units the airplane could be kept in substantially continuous operation during repair or overhaul of the power plant by merely substituting one power unit for another on an airplane. The enclosures or nacelles may be provided with small apertures or hand holes, not illustrated, to permit inspection of the power plant and minor repairs such as the changing of spark plugs.

A particularly important advantage of the illustrated arrangement is the provision of a vibration suppressing mounting for the engine and propeller which is so effective that little or no power plant vibration is transmitted to the airplane, and so that the engine vibrations are not transmitted to the propeller. By thus relieving the propeller of the stresses due to the imposition of engine vibration thereon a much lighter and more efficient propeller can be used. Also, by placing the reduction gear at the propeller end of the extension shaft and inserting the torque cushion drive between the engine and the extension shaft a much lighter and more flexible extension shaft can be used since the shaft is relieved to a large extent of the effect of engine vibration and is not subjected to the maximum torque.

While a particular mechanical embodiment has been hereinabove described and illustrated in the accompanying drawing for the purpose of disclosing the invention, it is to be understood that the invention is not limited to the particular arrangement so illustrated and described, but that such changes in the size, shape and arrangements of the various parts may be resorted to as come within the scope of the sub-joined claim.

Having now described the invention so that others skilled in the art may clearly understand the same, what it is desired to secure by Letters Patent is as follows:

An air craft power plant comprising, a streamlined supporting structure constituting a complete enclosure for said power plant, an engine, means resiliently supporting said engine in said enclosure, a controllable-pitch propeller operatively connected with said engine, a housing mounted within said enclosure and rigidly connected to said enclosure independently of said engine, said housing constituting a reservoir for propeller pitch changing fluid, a propeller supporting bearing mounted within said housing, propeller control means including a speed governor, a fluid pressure pump, and control valves for controlling the application of hydraulic fluid under pressure to said propeller said governor, pump and valves being mounted within said housing, and a flexible connection between said engine and said propeller.

FRANK W. CALDWELL.
ERLE MARTIN.